United States Patent
Neet et al.

(10) Patent No.: US 9,979,242 B2
(45) Date of Patent: May 22, 2018

(54) ELECTRIC MACHINE WITH WINDINGS HAVING END LOOP ARRANGEMENT

(71) Applicant: REMY TECHNOLOGIES, LLC, Pendleton, IN (US)

(72) Inventors: Kirk Neet, Pendleton, IN (US); Timothy J. Sailors, Westfield, IN (US)

(73) Assignee: BORGWARNER INC., Auburn Hills, MI (US)

( * ) Notice: Subject to any disclaimer, the term of this patent is extended or adjusted under 35 U.S.C. 154(b) by 229 days.

(21) Appl. No.: 15/135,320

(22) Filed: Apr. 21, 2016

(65) Prior Publication Data

US 2017/0310169 A1    Oct. 26, 2017

(51) Int. Cl.
| | |
|---|---|
| *H02K 1/00* | (2006.01) |
| *H02K 1/16* | (2006.01) |
| *H02K 3/12* | (2006.01) |
| *H02K 3/28* | (2006.01) |

(52) U.S. Cl.
CPC ............... *H02K 1/165* (2013.01); *H02K 3/12* (2013.01); *H02K 3/28* (2013.01)

(58) Field of Classification Search
CPC .......... H02K 3/28; H02K 3/12; H02K 1/165; H02K 1/16
USPC ................................. 310/179–180, 201–209
See application file for complete search history.

(56) References Cited

U.S. PATENT DOCUMENTS

| | | | |
|---|---|---|---|
| 4,954,734 A | | 9/1990 | Iguchi et al. |
| 5,986,375 A | * | 11/1999 | Umeda ................. H02K 1/165 310/180 |
| 6,617,723 B1 | | 9/2003 | Shichijyo |
| 6,882,077 B2 | | 4/2005 | Neet |
| 7,622,843 B2 | | 11/2009 | Cai |
| 8,716,910 B2 | | 5/2014 | Edrington |
| 2001/0011852 A1 | * | 8/2001 | Nakamura ............... H02K 3/34 310/215 |
| 2002/0011753 A1 | * | 1/2002 | Asao ....................... H02K 3/50 310/45 |

(Continued)

FOREIGN PATENT DOCUMENTS

| | | |
|---|---|---|
| EP | 1 225 676 B1 | 4/2012 |
| JP | 2004166316 A | 6/2004 |

(Continued)

OTHER PUBLICATIONS

International Search Report and Written Opinion of the International Searching Authority, PCT/US2017/022862, Jun. 9, 2017, 12 pages.

*Primary Examiner* — Thanh Lam
(74) *Attorney, Agent, or Firm* — Bose McKinney & Evans LLP

(57) ABSTRACT

An electric machine including a rotor and a stator and having a first winding. The stator slots define a plurality of layer positions wherein each of the layer positions is at a different radial distance from the axis. There is an odd number of select stator slots wherein for two slot segments disposed in different layer positions, a pair of end loops connect each of the slot segments with another slot segment in a different slot that is in the same layer position. In some embodiments, at least 60 percent of the end loops connect slot segments that are disposed in different layer positions. For some embodiments, only a single select stator slot is provided with the end loops being positioned to reduce spatial conflicts.

20 Claims, 14 Drawing Sheets

(56) References Cited

U.S. PATENT DOCUMENTS

| | | |
|---|---|---|
| 2002/0092152 A1 | 7/2002 | Asao et al. |
| 2004/0061400 A1 | 4/2004 | Fukushima et al. |
| 2004/0100157 A1* | 5/2004 | Bori .................. H02K 15/0056 310/201 |
| 2007/0018525 A1* | 1/2007 | Cai ......................... H02K 3/28 310/184 |
| 2014/0145540 A1 | 5/2014 | Detela et al. |

FOREIGN PATENT DOCUMENTS

| | | |
|---|---|---|
| JP | 2009017632 A | 1/2009 |
| JP | 2015004528 A | 1/2015 |
| KR | 20150100425 A | 9/2015 |

\* cited by examiner

ELECTRIC MACHINE WITH WINDINGS HAVING END LOOP ARRANGEMENT

BACKGROUND

The present invention relates to electric machines and, more specifically, to winding arrangements for electric machines.

Many electric machines employ stators that have a core with a plurality of axially extending slots to receive one or more windings. Each winding is formed out of a continuous electrical conductor that extends through many of the stator slots with end loop portions connecting the winding segments disposed in the stator slots. The end loops extend beyond the axial ends of the stator core. The two opposing ends of the winding are connected to an appropriate component of the electric machine which may differ depending upon the design of the electric machine.

For many electric machines, such as those having a wye-configuration, one end of the winding will be a phase lead that is connected to an electrical source or load with the other end of the winding being connected to a neutral connection. The two ends of the winding generally extend from the same axial end of the stator. Many windings also include a reversing loop at the midpoint of the winding. Generally, each end loop will connect slot segments disposed in different layers, a conventional reversing end loop, however, connects two slot segments that are in the same layer. The winding may also have an electrical connection at this midpoint of the winding, for example, the winding may have an appropriate connection to provide either a series configuration or a parallel configuration. The reversing loop and connection, e.g., series connection, are generally also located at the same axial end of the stator as the two ends of the winding. These various features of the windings can be difficult to accommodate in the limited space available at the axial end of the stator. Multiple phase electric machines, e.g., three phase electric machines, will include at least the same number of windings as there are phases with each winding presenting such spatial difficulties.

FIG. 1 presents one phase of a conventional winding diagram. This diagram depicts a winding 20 wherein each slot holds two layers of the winding. The two layers are at different radial distances from the central axis but lie on a common radial line extending outwardly from the central axis. In this diagram, the winding is depicted in both solid lines and dashed lines. The use of a solid line designates that the winding is positioned in a first layer while the dashed line designates that the winding is positioned in a second layer. Circles 22 represent welds where the two hairpin wire segments have been welded together. One end 24 of winding 20 is a phase lead which would be connected to a rectifier or other component. The opposite end 26 of winding 20 is connected to a neutral connection 28. A reversing loop 30 is located at the midpoint of winding 20 and forms a series connection between the two halves of winding 20. As can be seen in this diagram, both the neutral connection 28 and reversing loop 30 are located in the same layer. This requires that either the neutral connector 28 or reversing loop 30 be axially displaced to spatially accommodate both of these structures.

FIG. 2 is a schematic winding diagram illustrating the use of three windings 20 wherein each of the windings 20 have the same configuration as depicted in FIG. 1. Such an arrangement would be suitable for a three phase electric machine. As can be understood with reference to FIG. 2, each winding does not have a segment in each slot of the stator core. FIG. 2 illustrates how neutral connection 28 is used to connect the neutral lead 26 of each of the three different phases together in an electric machine having a wye configuration. Those having ordinary skill in the art will understand the arrangement and functioning of the windings 20 depicted in FIG. 2.

For some electric machine designs, the spatial conflict created by the reversing loop and neutral connection being in the same layer presents a significant problem. For example, electric machines utilizing what are commonly referred to as large "hairpins" to form the stator windings may be encounter spatial conflicts at the axial ends of the stator. Large hairpins, when used in the context of stator windings, generally refer to wire with a cross sectional area of 4 mm² or greater. Such hairpins typically have a generally U-shape with a central end loop section and two legs. The two legs are inserted through slots in the stator and then are welded to adjacent hairpin legs at one end of the stator to thereby form a continuous winding from a plurality of hairpins.

Such windings, and their various features, must fit into a spatial envelope that is commonly defined by 1) the rotor and rotor fan corresponding to the internal diameter of the stator; 2) the housing corresponding to the outer diameter of the housing; and 3) the housing end surface disposed axially beyond the end turns of the winding.

Several methods have been used to address the spatial conflicts that arise at this location within the electric machine. For example, U.S. Pat. No. 8,716,910 B2, which is hereby incorporated herein by reference, discloses an electric machine wherein the windings include jumper segments 32 that extend into the inner cylindrical space defined by the stator. This arrangement is depicted in FIG. 4 and works well for electric machines having an external fan or no fan at all. However, the position of the jumper 32 can conflict with the use of an internal fan coupled with the rotor and located within the cylindrical space defined by the internal diameter 34 of the stator core 36.

Another known approach to addressing these spatial conflicts is employed in alternators manufactured by Prestolite Electric Inc. headquarted in Novi, Michigan and which markets products under both the Prestolite Electric and Leece-Neville brand names. In this approach, depicted in FIG. 3, at one axial end of the stator, one end 38 of the winding 40 extends to form the phase lead and a reversing loop 42 is present and includes a series connection. The opposite end of the winding 44 is coupled with a neutral connection 46. Instead of having the neutral connection 46 at the same axial end of the stator as the phase lead 38, the neutral connection 46 is located at the opposite axial end of the stator. By placing the neutral connection at the opposite axial end, the spatial constraints are relieved. This arrangement, however, requires that, for one slot, one pass of the winding is omitted. For a stator winding having two layers, this will result in one slot that has only half filled by the winding. This half empty slot reduces the output of the electric machine and can generate magnetic noise during operation of the electric machine.

Further improvements which alleviate the spatial constraints present at the axial ends of electric machines are desirable.

SUMMARY

The present invention provides an electric machine having a stator winding arrangement that reduces the spatial conflicts proximate the end loops of the stator.

The invention comprises, in one form thereof, an electric machine that includes a rotor rotatable about an axis and operably coupled with a stator wherein the stator defines opposing first and second axial ends and a plurality of axially extending stator slots. At least one winding defines at least one phase and the at least one winding includes a first winding of a first phase. The first winding includes a conductor extending from a first end to a second end wherein, between the first and second ends, the first winding defines a plurality of slot segments and a plurality of end loops. Each of the slot segments are disposed within one of the stator slots and each of the end loops connect a pair of the slot segments disposed in different stator slots. Each of the stator slots define a plurality of layer positions wherein each of the layer positions is at a different radial distance from the axis whereby slot segments are positionable in the plurality of layer positions of each stator slot. More specifically, at least one slot segment is positionable in each of the plurality of layer positions of each stator slot. At least 60 percent of the end loops defined by the first winding connect a slot segment disposed in one of the plurality of layer positions with another slot segment disposed in another one of the plurality of layer positions. For the first winding, the electric machine defines an odd number of select stator slots wherein, at each of the select stator slots, first and second slot segments disposed in the select stator slot are located in different layer positions, the first and second slot segments being respectively connected to first and second end loops wherein the first end loop connects the first slot segment with a third slot segment disposed in the same layer position as the first slot segment and the second end loop connects the second slot segment with a fourth slot segment disposed in the same layer position as the second slot segment.

In some embodiments of the electric machine there is only one select stator slot.

In some embodiments, the first end loop defines a first pair of legs and a first central portion extending between the first pair of legs and a second end loop defines a second pair of legs and a second central portion extending between the second pair of legs, each of the legs of the first and second end loops being connected with a slot segment and wherein one of the first and second pair of legs are inclined in a clockwise direction and the other one of the first and second pair of legs are inclined in a counter-clockwise direction.

In some embodiments, the first and second ends of the first winding are disposed at the first axial end of the stator and the first and second end loops are disposed at the second axial end of the stator. In such an embodiment, there may be only one select stator slot. Such an embodiment may also be configured such that the first and second ends of the first winding are connected with slot segments disposed in different layer positions. In yet another variant of such an embodiment, the first winding may include a plurality of hairpin segments wherein each hairpin segment defines an end turn connecting two legs, each of the two legs defining a slot segment with the distal portion of the legs defining a portion of an end turn and wherein distal portions of separate and adjacent hairpin segments are welded together to form the conductor defining the winding and wherein the welds are all disposed on the second axial end of the stator.

In other embodiments, the first and second ends of the first winding and the first and second end turns are all disposed at the first axial end of the stator. In variants of such an embodiment, there may be only one select stator slot.

In some embodiments, the electric machine defines a three phase electric machine and a second phase of the electric machine is defined, at least in part, by a second winding wherein the second winding includes a second conductor extending from a third end to a fourth end. Between the third and fourth ends, the second winding defines a second plurality of slot segments and a second plurality of end loops, each of the second plurality of slot segments being disposed within one of the stator slots and each of the second plurality of end loops connecting a pair of the second plurality of slot segments disposed in different stator slots. At least 60 percent of the second plurality of end loops defined by the second winding connect a slot segment disposed in one of the plurality of layer positions with another slot segment disposed in another one of the plurality of layer positions. For the second phase, the electric machine defines an odd number of second phase select stator slots wherein, at each of the second phase select stator slots, fifth and sixth slot segments disposed in the second phase select stator slot are located in different layer positions, the fifth and sixth slot segments being respectively connected to third and fourth end loops wherein the third end loop connects the fifth slot segment with a seventh slot segment disposed in the same layer position as the fifth slot segment and the fourth end loop connects the sixth slot segment with an eighth slot segment disposed in the same layer position as the sixth slot segment.

In some embodiments of the electric machine having a second winding, first and second ends of the first winding and the third and fourth ends of the second winding are all disposed at the first axial end of the stator and the first, second, third and fourth end loops are all disposed at the second axial end of the stator. The electric machine further includes a neutral connection wherein the neutral connection is connected with one of the first and second ends of the first winding and one of the third and fourth ends of the second winding. The neutral connection is formed by a conductor defining a segment of a circle that extends for less than 360 degrees and which is disposed at the same radial distance from the axis as one of the first and second slot segments at the first axial end of the stator.

In such an electric machine having a neutral connection, the electric machine may have a third phase that is defined, at least in part, by a third winding which includes a third conductor extending from a fifth end to a sixth end with the fifth and sixth ends being disposed at the first axial end of the stator. Between the fifth and sixth ends, the third winding defines a third plurality of slot segments and a third plurality of end loops, each of the third plurality of slot segments being disposed within one of the stator slots and each of the third plurality of end loops connecting a pair of the third plurality of slot segments disposed in different stator slots. At the first axial end of the stator, and for the stator slots within the circular segment defined by the neutral connection, the third plurality of end loops defined by the third winding connect a slot segment disposed in one of the plurality of layer positions with another slot segment disposed in another one of the plurality of layer positions.

In some variants of an embodiment having such a third winding, at least 60 percent of the third plurality of end loops defined by the third winding may connect a slot segment disposed in one of the plurality of layer positions with another slot segment disposed in another one of the plurality of layer positions. Additionally, for such a third phase, the electric machine may define an odd number of third phase select stator slots wherein, at each of the third phase select stator slots, ninth and tenth slot segments disposed in the third phase select stator slot are located in different layer positions, the ninth and tenth slot segments being respectively connected to fifth and sixth end loops wherein the fifth end loop connects the ninth slot segment with an eleventh slot segment disposed in the same layer position as the ninth slot segment and the sixth end loop connects the tenth slot segment with a twelfth slot segment disposed in the same layer position as the tenth slot segment. In some variants, there is only one select stator slot, there is only one second phase select stator slot, there is only one third phase select stator slot and the fifth and sixth end loops are disposed at the first axial end of the stator.

The invention comprises, in another form thereof, an electric machine that includes a rotor rotatable about an axis and operably coupled with a stator wherein the stator defines opposing first and second axial ends and a plurality of axially extending stator slots. The electric machine also includes at least one winding defining at least one phase, the at least one winding including a first winding of a first phase wherein the first winding includes a conductor extending from a first end to a second end. Between the first and second ends, the first winding defines a plurality of slot segments and a plurality of end loops, each of the slot segments being disposed within one of the stator slots and each of the end loops connecting a pair of the slot segments disposed in different stator slots. Each of the stator slots define a plurality of layer positions wherein each of the layer positions are at a different radial distance from the axis whereby slot segments are positionable in the plurality of layer positions of each stator slot. More specifically, at least one slot segment is positionable in each of the plurality of layer positions of each stator slot. The first winding defines a series connection at the first axial end of the stator at the midpoint of the first winding. The midpoint of the first winding is disposed in an end loop connecting a pair of slot segments disposed in different layer positions. For the first winding, the electric machine defines an odd number of select stator slots wherein, at each of the select stator slots, first and second slot segments disposed in the select stator slot are located in different layer positions, the first and second slot segments being respectively connected to first and second end loops wherein the first end loop connects the first slot segment with a third slot segment disposed in the same layer position as the first slot segment and the second end loop connects the second slot segment with a fourth slot segment disposed in the same layer position as the second slot segment.

In some embodiments of such an electric machine, at least 60 percent of the end loops defined by the first winding connect a slot segment disposed in one of the plurality of layer positions with another slot segment disposed in another one of the plurality of layer positions.

In some embodiments, the first end loop defines a first pair of legs and a first central portion extending between the first pair of legs and a second end loop defines a second pair of legs and a second central portion extending between the second pair of legs wherein each of the legs of the first and second end loops are connected with a slot segment and wherein one of the first and second pair of legs are inclined in a clockwise direction and the other one of the first and second pair of legs are inclined in a counter-clockwise direction.

In yet other embodiments of the electric machine, the electric machine defines a three phase electric machine and a second phase of the electric machine is defined, at least in part, by a second winding which includes a second conductor extending from a third end to a fourth end. Between the third and fourth ends, the second winding defines a second plurality of slot segments and a second plurality of end loops wherein each of the second plurality of slot segments are disposed within one of the stator slots and each of the second plurality of end loops connect a pair of the second plurality of slot segments disposed in different stator slots. The second winding defines a series connection at the first axial end of the stator at the midpoint of the second winding and the midpoint of the second winding is disposed in an end loop connecting a pair of slot segments disposed in different layer positions. For the second phase, the electric machine defines an odd number of second phase select stator slots wherein, at each of the second phase select stator slots, fifth and sixth slot segments disposed in the second phase select stator slot are located in different layer positions, the fifth and sixth slot segments being respectively connected to third and fourth end loops wherein the third end loop connects the fifth slot segment with a seventh slot segment disposed in the same layer position as the fifth slot segment and the fourth end loop connects the sixth slot segment with an eighth slot segment disposed in the same layer position as the sixth slot segment.

In some embodiments of such an electric machine including a second winding, the electric machine may further include a third phase that is defined, at least in part, by a third winding which includes a third conductor extending from a fifth end to a sixth end, the fifth and sixth ends being disposed at the first axial end of the stator. Between the fifth and sixth ends, the third winding defines a third plurality of slot segments and a third plurality of end loops wherein each of the third plurality of slot segments are disposed within one of the stator slots and each of the third plurality of end loops connect a pair of the third plurality of slot segments disposed in different stator slots. The third winding defines a series connection at the first axial end of the stator at the midpoint of the third winding wherein the midpoint of the third winding is disposed in an end loop connecting a pair of slot segments disposed in different layer positions. For the third phase, the electric machine defines an odd number of third phase select stator slots wherein, at each of the third phase select stator slots, ninth and tenth slot segments disposed in the third phase select stator slot are located in different layer positions, the ninth and tenth slot segments being respectively connected to fifth and sixth end loops wherein the fifth end loop connects the ninth slot segment with an eleventh slot segment disposed in the same layer position as the ninth slot segment and the sixth end loop connects the tenth slot segment with a twelfth slot segment disposed in the same layer position as the tenth slot segment.

In such an embodiment having a third winding, the electric machine may be configured such that the end loop containing the midpoint of the first winding, the end loop containing the midpoint of the second winding and the end loop containing the midpoint of the third winding are all shaped similar to immediately adjacent end loops and thereby nest with the immediately adjacent end loops.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
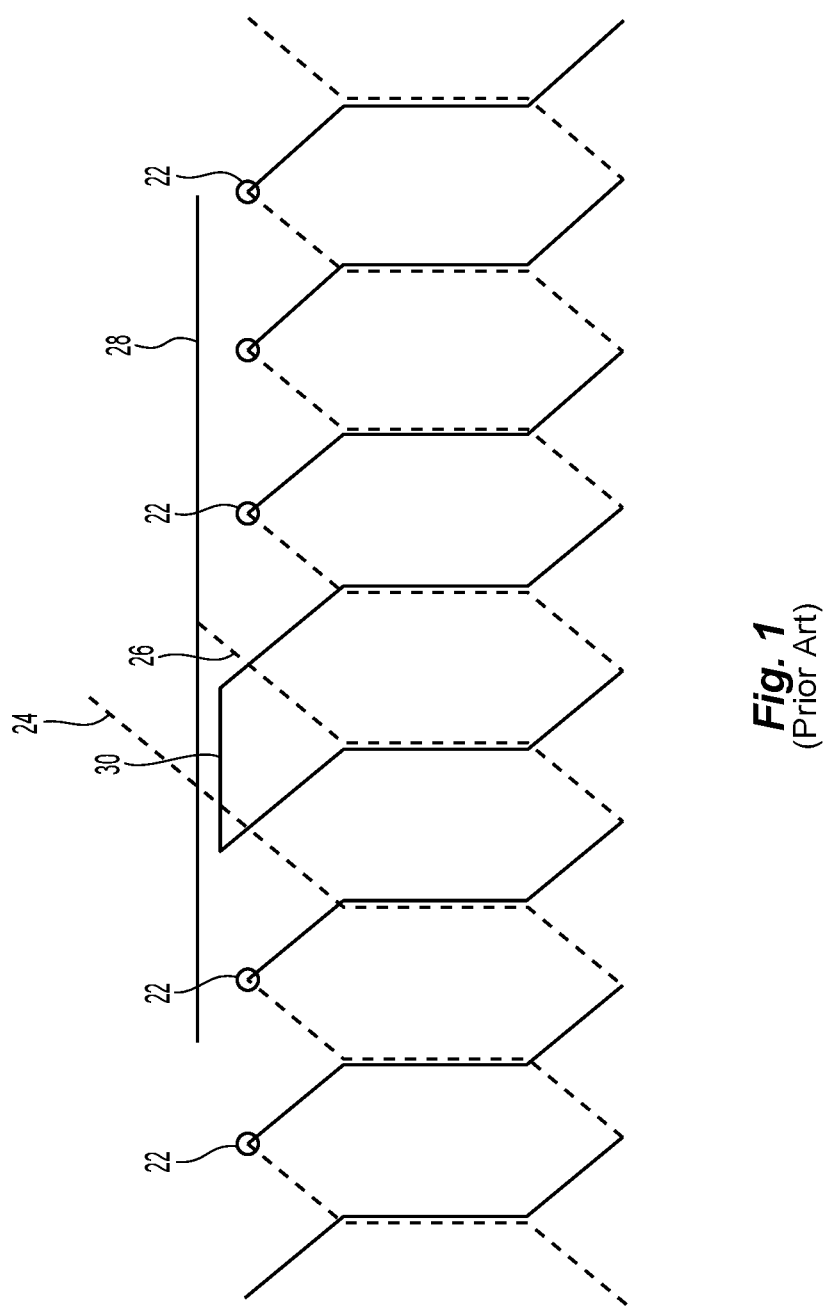
FIG. 1 is a schematic winding diagram of a prior art configuration.
Figure 2:
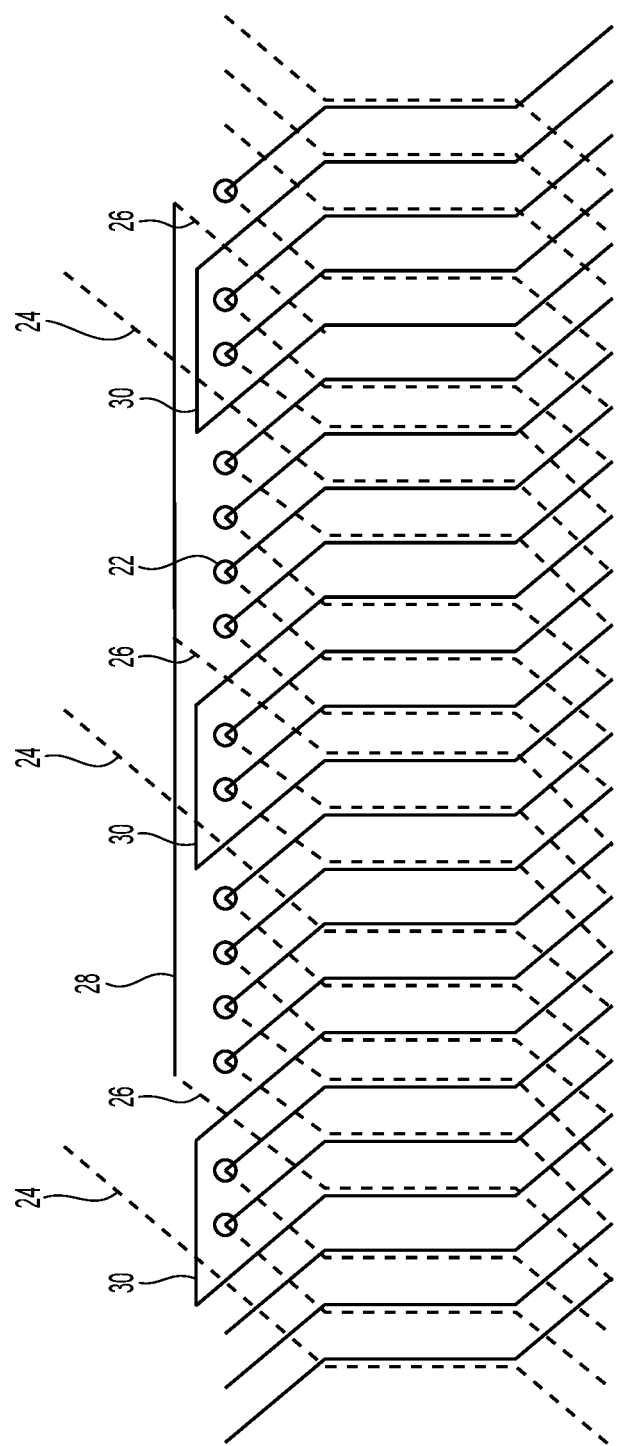
FIG. 2 is a schematic winding diagram of a prior art configuration.
Figure 3:
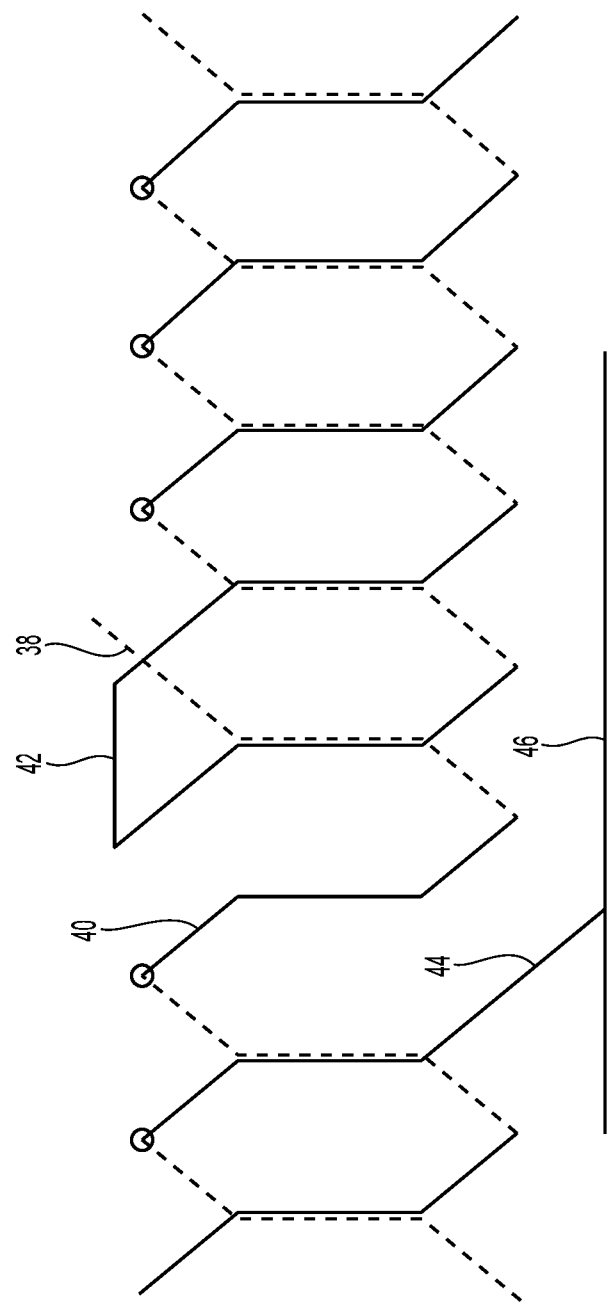
FIG. 3 is a schematic winding diagram of a prior art configuration.
Figure 4:
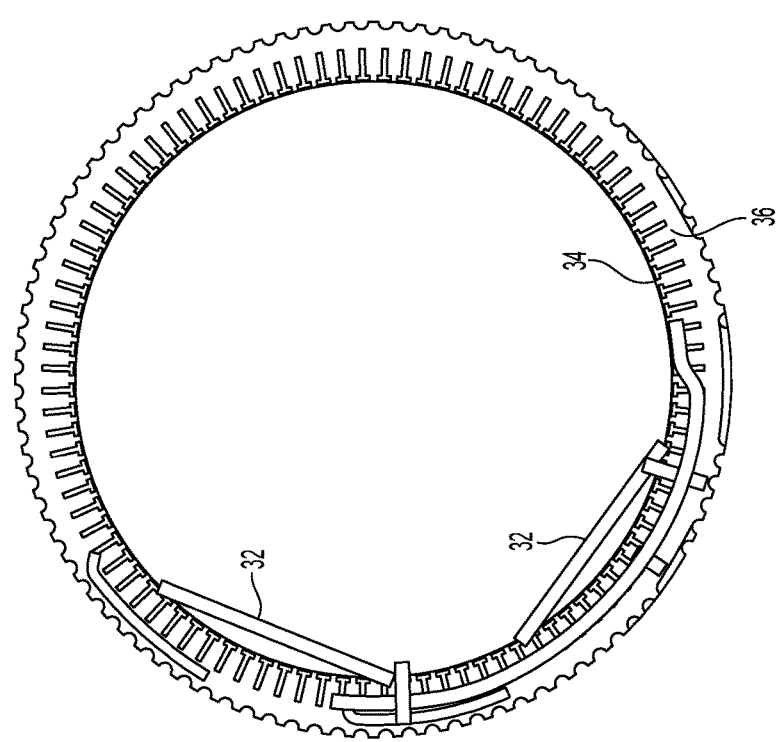
FIG. 4 is a top view of a prior art stator assembly.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

Figure 11:
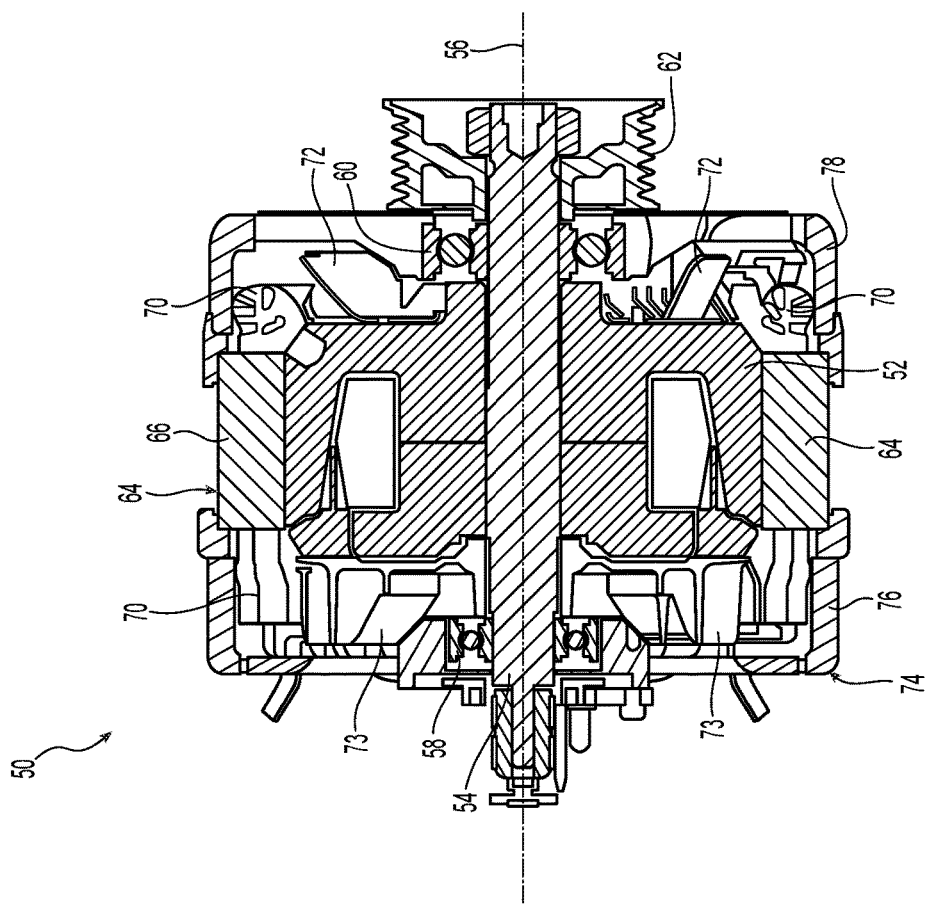
FIG. 11 is a cross sectional view of an electric machine.

An electric machine 50 is depicted in FIG. 11 and includes a rotor 52 mounted on a rotor shaft 54 and rotatable about axis 56. The exemplary embodiment is an electric machine 50 that is adapted for use as an AC generator for a vehicle and rotor 52 is what is commonly referred to as a clamshell rotor. Bearings 58, 60 support shaft 54 and a pulley 62 is mounted on one end of shaft 54. A belt (not shown) couples pulley 62 with the crankshaft of the vehicle. A rectifier assembly converts the AC current generated by electric machine 50 to DC current for charging the battery of the vehicle or powering electrical components of the vehicle.

Rotor 52 is operably coupled with stator 64. Stator 64 includes a stator core 66 having a plurality of axially extending slots 68 circumferentially disposed about the inner diameter of stator core 66. A plurality of windings 70 are disposed in slots 68 and extend axially beyond opposite ends of stator core 66. A fan 72 is coupled with rotor 52 and rotates together with rotor 52 to cool electric machine 50 during operation. A second fan 73 is mounted on the opposite side of rotor 52 and also helps to dissipate heat during operation. A housing assembly 74 includes end caps 76, 78 located on opposite ends of stator core 66.

Figure 12:
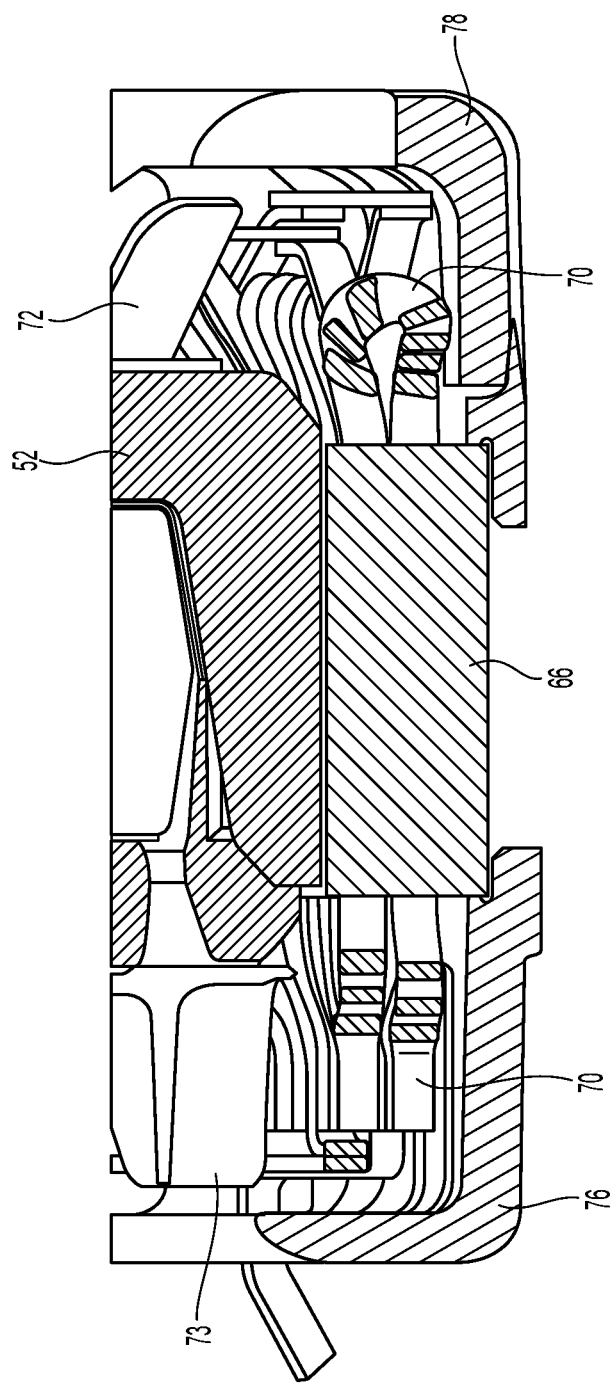
FIG. 12 is a detailed view of the cross section of FIG. 11.

As can be seen in FIG. 12, the space available for the end turns of windings 70 is limited. On one end of stator 64, the space for the end turns is limited by fan 72 in the radially inward direction and is limited by end cap 78 in the axial direction and in the radially outward direction. Similarly, on the opposite side of stator 64, the space available for the end turns is limited by fan 73 in the radially inward direction and is limited by end cap 76 in the axial direction and in the radially outward direction.

The illustrated electric machine 50 is a three phase electric machine, however, various alternative embodiments are also possible. For example, it may be a single phase or a multi-phase electric machine having more or less than three phases. The electric machine will include at least one winding for each phase and may include multiple windings for each phase.

Figure 5:
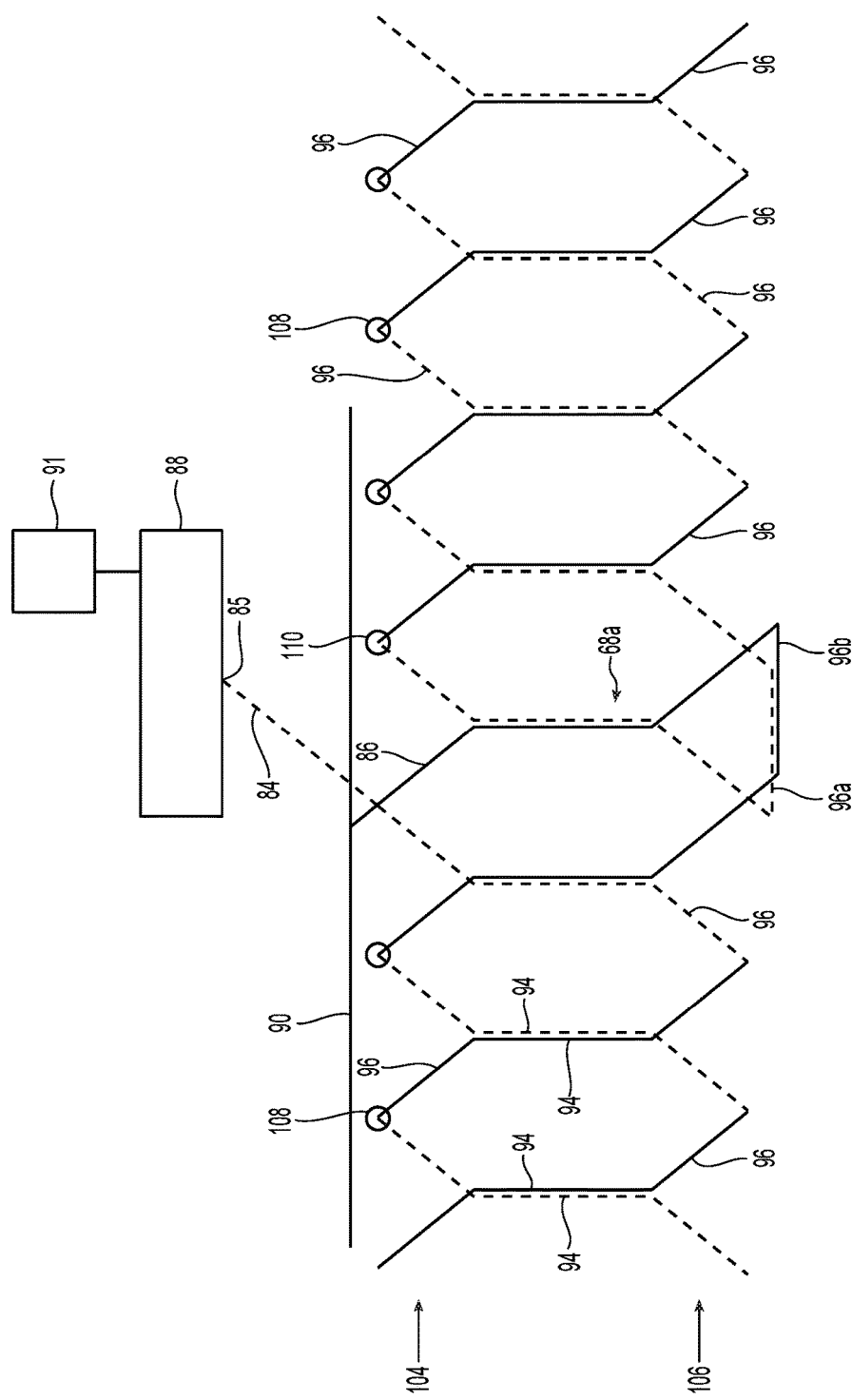
FIG. 5 is a schematic winding diagram depicting an embodiment of a single winding for reducing spatial conflicts.

The stator has two opposing axial ends 104, 106. Each of the windings 70 takes the form of a continuous electrical conductor that extends from a first end 84 to a second end 86. First end 84 forms a stator lead 85 that is coupled to a phase connection 88, such as a terminal assembly. The phase connection 88 conductively couples the first end 84 with the appropriate component of the electric machine assembly or external circuit. In the illustrated embodiment, phase connection 88 takes the form of a terminal assembly that conductively couples the first end 84/stator lead 85 with a rectifier 91 as schematically depicted in FIG. 5. In a three phase electric machine, a terminal assembly may take the form of three conductive tracks that are overmolded with a polymeric material with each of the different conductive tracks connecting phase leads from a different phase to the appropriate diode in a rectifier. The use of such terminal assemblies to connect phase leads to rectifiers is known in the art.

The second end 86 of winding 70 defines a neutral lead 87 that is conductively coupled with a neutral connection 90. Neutral connection 90 is a conductive member that conductively couples each of the neutral leads 87 of windings 70 together. Neutral connection 90 may also be connected to an external neutral lead or ground.

Between the first and second ends 84, 86, winding 70 defines a plurality of slot segments 94 and a plurality of end loops 96. Each of the slot segments 94 are axially extending portions of winding 70 that are disposed in one the slots 68 of stator core 66. Each of the end loops 96 connects a pair of the slot segments 94.

Figure 15:
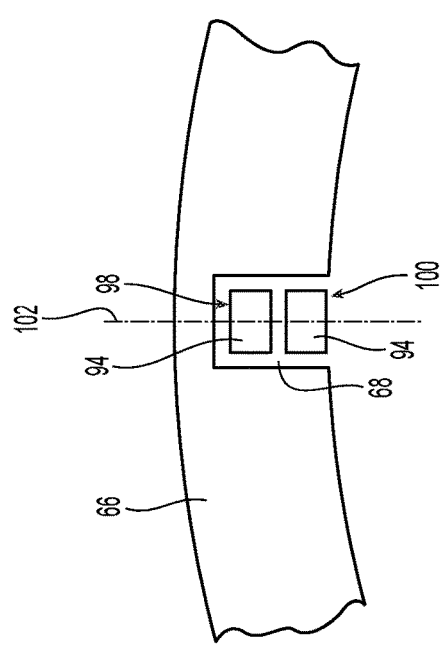
FIG. 15 is a schematic depiction of an individual stator slot.

In the illustrated embodiment, each of the slots defines two layer positions wherein the first layer 98 is located at a first radial distance from axis 56 and the second layer 100 is located at a second radial distance from axis 56. By providing slots 68 with a radial depth that provides for two layers, each slot 68 can receive a first slot segment 94 that is positioned in the first layer position 98 and a second slot segment 94 that is positioned in the second layer position 100 and wherein the two slot segments lie on a common radial line 102 extending out from axis 54. The arrangement of two such slot segments 94 in first and second layer positions is schematically depicted in FIG. 15. In the illustrated embodiment, each stator slot 68 has a circumferential width that is sized to permit only a single strand of winding 70 in each layer and a radial depth that permits two layers of winding 70. Alternative embodiments, however, could have slots with a greater radial depth to provide for a greater number of layers and/or slots with a greater circumferential width to permit multiple strands of windings 70 in each layer. It is further noted that while the terms first layer and second layer are used in the present application, the use of these terms does not imply a specific position in the slot and merely indicates that a slot segment in the first layer is located in a different layer than a slot segment located in the second layer. For example, a winding could include slot segments in four different layers with the first layer being any one of the four layers and the second layer being any one of the other three layers.

FIG. 5 schematically depicts a winding diagram that reduces spatial conflicts at the axial ends of stator 64. For purposes of graphical clarity, only a single winding 70 is depicted in FIG. 5. At first axial end 104 of stator 64, each of the end loops 96 connect a slot segment 94 that is disposed in first layer 98 to a slot segment 94 that is disposed in second layer 100. The two ends 84, 86 of winding 70 are also located at first end 104 of stator 64. As can be seen in FIG. 5, first end 84 of winding 70 which forms stator lead 85 is connected with a slot segment located in the first layer 98 and second end 86 of winding 70 which forms neutral lead 87 is connected with a slot segment located in the second layer 100. The neutral connection 90 is also located at the same radial distance from axis 54 as is second layer 100 and defines a segment of a circle. This arrangement places stator lead 85 at a different radial distance from axis 54 than that of the neutral lead 87 and neutral connection 100 and thereby allows stator lead 85 to extend axially past neutral lead 87 and neutral connection 100 at the first axial end 104 of stator 64.

To allow for this arrangement, the slot segments in a select stator slot 68a are coupled with two special end loops at the second axial end 106 of stator 64. At select stator slot 68a, a slot segment 94 located in the first layer 98 is connected by end loop 96a to another slot segment 94 that is disposed in the first layer 98. Similarly, the slot segment 94 located in second layer 100 of the selected slot 68a is connected by end loop 96b to another slot segment 94 located in the second layer 100. As can be seen in FIG. 5, while each of the end loops 96a, 96b are connected with a slot segment in select slot 68a, the end loops 96a, 96b connect to segments 94 located on opposite circumferential sides of select slot 68a. Each of the remaining end loops 96 located on the second axial end 106 of stator 64 connect a slot segment 94 located in the first layer 98 with a slot segment 94 located in the second layer 100. It is noted that the term "select" stator slot, simply means that this particular stator slot has been selected to have the end loop arrangement described above.

It is further noted that this select stator slot 68a arrangement may be described as involving first and second slot segments 94 which are disposed in the select stator slot 68a and located in different layer positions, the first and second slot segments being respectively connected to first and second end loops 96a, 96b wherein the first end loop 96a connects the first slot segment with a third slot segment disposed in the same layer position as the first slot segment and the second end loop 96b connects the second slot segment with a fourth slot segment disposed in the same layer position as the second slot segment.

End loops 96a, 96b can be positioned at second end 106 at any one of the slots. It will, however, generally be more efficient to assemble stator 64 if one of the ends 84, 86 of winding 70 extends from one of the slot segments 94 in select slot 68a and that connects with one of the end loops 96a, 96b on the opposite side 106 of stator 64. In FIG. 5, it is second end 86 which forms neutral lead 87 that extends from a stator segment 94 in slot 68a which is the slot that that contains slot segments 94 connected with each of the end loops 96a, 96b.

It is further noted that rather than positioning end loops 96a, 96b at second end 106, similar end loops could alternatively be positioned at the first axial end of the stator as further discussed below with reference to FIG. 17. Furthermore, while it will generally be desirable to limit the number of select stator slots 68a having an end loop arrangement wherein two of the slot segments are connected with slot segments that are located in the same layer position, the ability to have the two ends of the winding attached to slot segments located in different layer positions can be achieved by providing a greater number of such select stator slots so long as there is an odd number of such select stator slots. Moreover, the special end loops associated with such select stator slots can be positioned at either axial end of the stator.

As mentioned above, it is possible to utilize more than one select stator slot 68a and still have the two winding ends connected to slot segments in different layers so long as an odd number of select stator slots 68a are employed. While it will generally be desirable to employ only one or a small limited number of such select stator slots 68a, for particular applications, it may be desirable to use a relatively larger number. However, as the number of such select stator slots 68a is increased, there is a potential to negatively impact the performance of the electric machine and it is thought that at least 60 percent of the end loops defined by any one winding having one or more select stator slots should connect slot segments that are disposed in different layer positions.

In the embodiment depicted in FIG. 5, winding 70 defines a series connection at first axial end 104. In this regard, it is noted that winding 70 circumscribes the stator twice and it is at midpoint 110 where the series connection is located. In other words, on one side of the series connection, the winding 70 fully encircles stator and then ends at first end 84 and on the other side of the series connection, winding 70 fully encircles the stator then terminates at second end 86. This connection between the two halves of winding 70 at midpoint 110 can take alternative forms. For example, while a series connection is shown, some electric machines employ a parallel connection (not shown). In most conventional electric machines, a series connection is provided at the midpoint of a winding in a reversing loop that connects two slot segments that are in the same layer. In contrast, the midpoint 110 of the winding shown in FIG. 5 is located in an end loop 96 which connects one of the slot segments 94 in the first layer 98 to one of the slot segments 94 in the second layer 100. This allows the end loop containing the midpoint 110 to have the same configuration as the other end loops 96 and thereby nest within the confines of adjacent end loops 96. In other words, the end loop 96 containing midpoint 110 is shaped similar to the immediately adjacent end loops 96 to thereby allow the end loop with midpoint 110 to nest with the immediately adjacent end loops 96. For three phase electric machines, this arrangement can be employed with each of the three phases.

Figure 6:
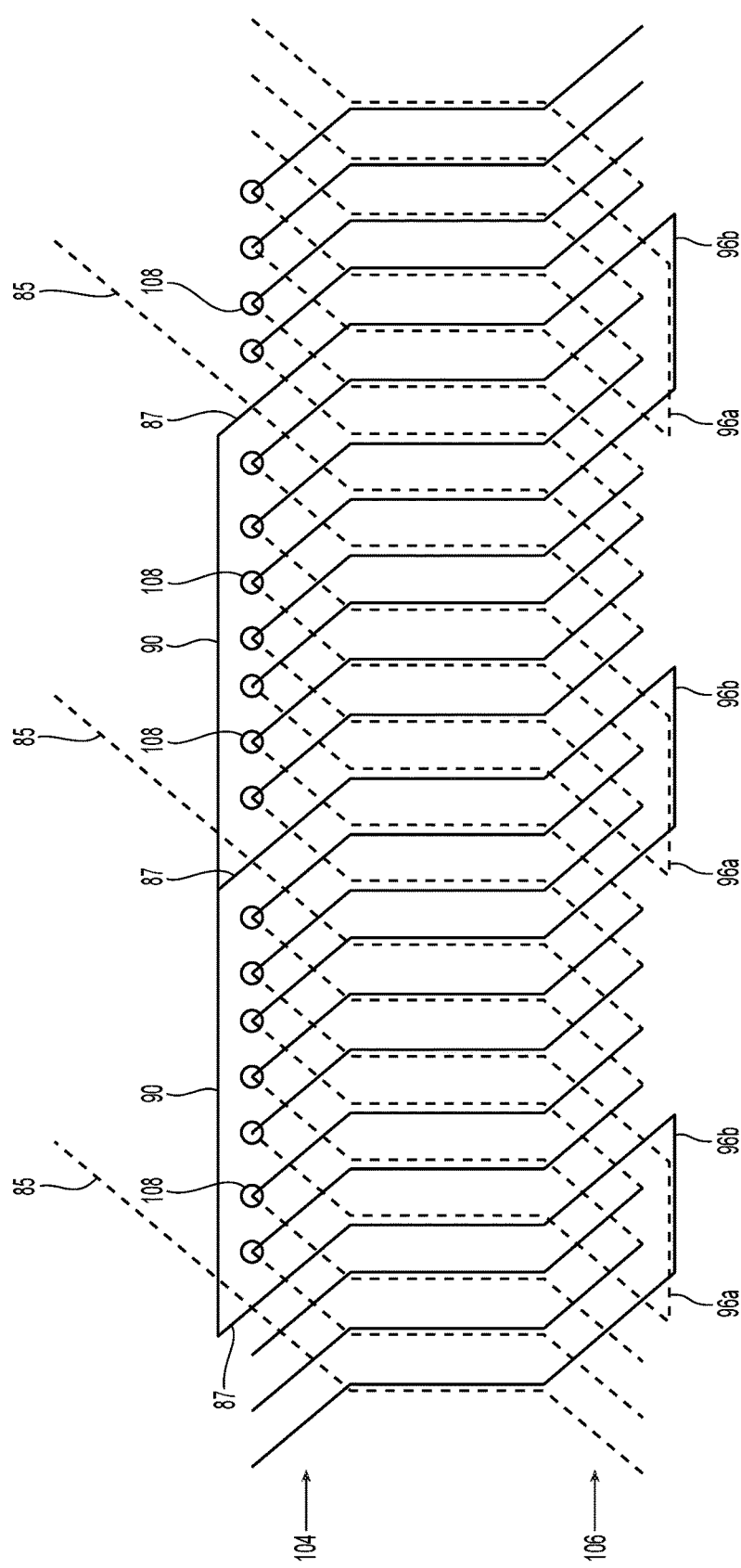
FIG. 6 is a schematic winding diagram depicting three windings.

FIG. 6 schematically depicts a winding diagram which includes three windings 70 that each have the same configuration as the winding depicted in FIG. 5. The three different windings are circumferentially offset and define three different phases of the electric machine. The schematic depictions of FIGS. 1-3 and 5-8 are a linear representation of the full 360 degrees of a cylindrical stator. In view of this format, FIG. 6 shows that neutral connection 90 is capable of connecting each of the neutral leads 87 of the three windings 70 without it being necessary for neutral connection 90 to extend the full 360 degrees about the circumference of stator 64.

Figure 16:
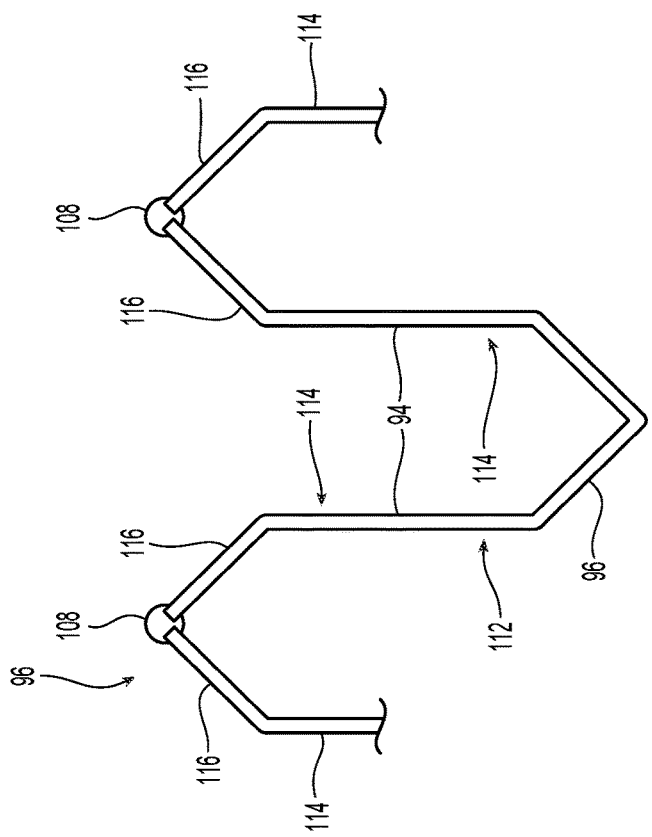
FIG. 16 is a schematic depiction of a hairpin segment.

The windings 70 depicted in FIGS. 5-8 are formed out of a plurality of hairpin segments 112 and circles are used to represent welds 108. A single hairpin segment 112 and its connection with two adjacent hairpin segments 112 are schematically depicted in FIG. 16. As can be readily understood with reference to FIG. 16, the hairpin segments 112 define defines an end turn 96 connecting two legs 114. Each of the legs 114 defines a slot segment 94 with a distal portion 116 of the legs 114 defining a portion of an end turn 96. The distal portions 116 of separate and adjacent hairpin segments 112 are welded together (welds 108) to form the continuous conductor defining the winding 70.

Figure 7:
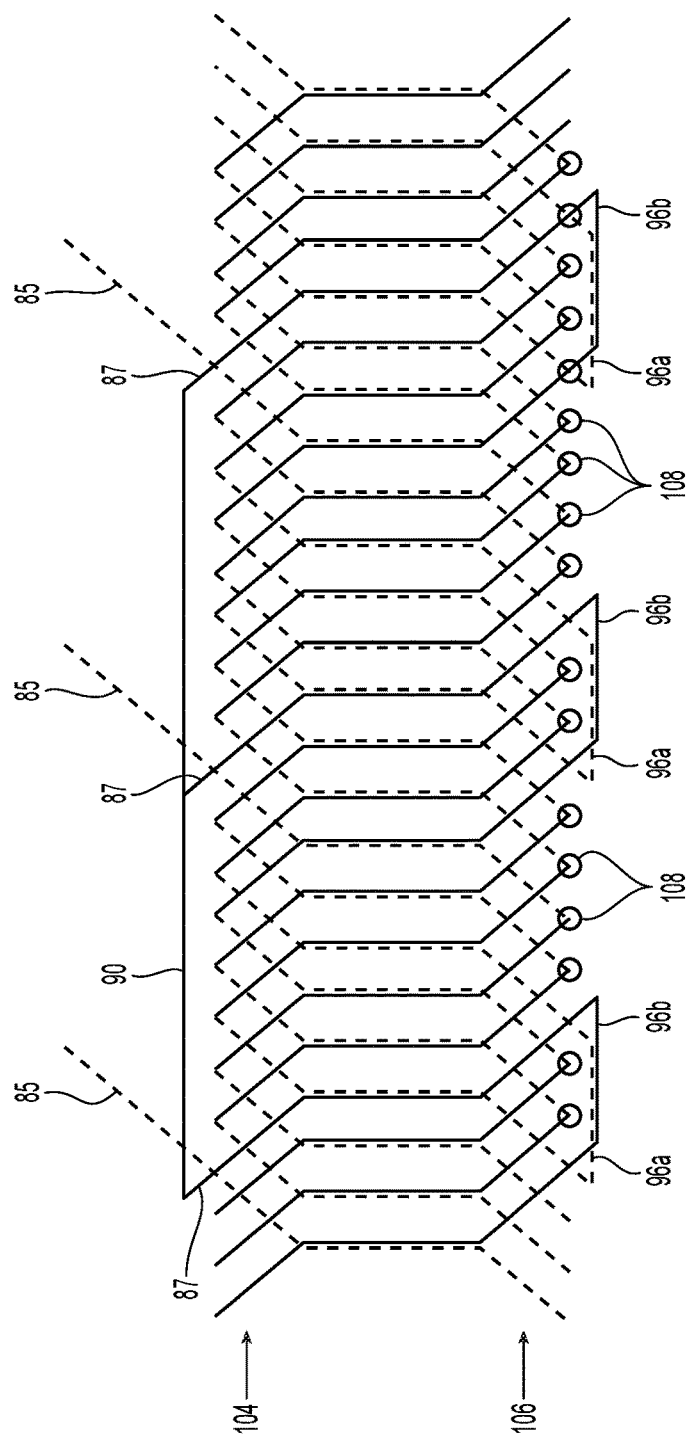
FIG. 7 is an alternative schematic winding diagram depicting three windings.

In FIG. 6, hairpin segments 112 have been inserted into slots 68 such that all of the welds 108 are located at first axial end 104 of stator 64. FIG. 7 is a schematic depiction of an alternative winding arrangement. The embodiment of FIG. 7 is very similar to that of FIG. 6 but instead of inserting the hairpin segments 112 such that they must be welded at first end 104, they are arranged such that the welds 108 are formed on the second axial end 106 of stator 64. This arrangement can provide manufacturing efficiencies because it allows the welds to be formed without interference with the stator leads 85 and neutral leads 87 which are located on the first axial end 104 of stator 64. For some applications, however, other features of the electric machine may make it more desirable to form welds 108 at the first axial end 104 as depicted in FIG. 6.

Figure 8:
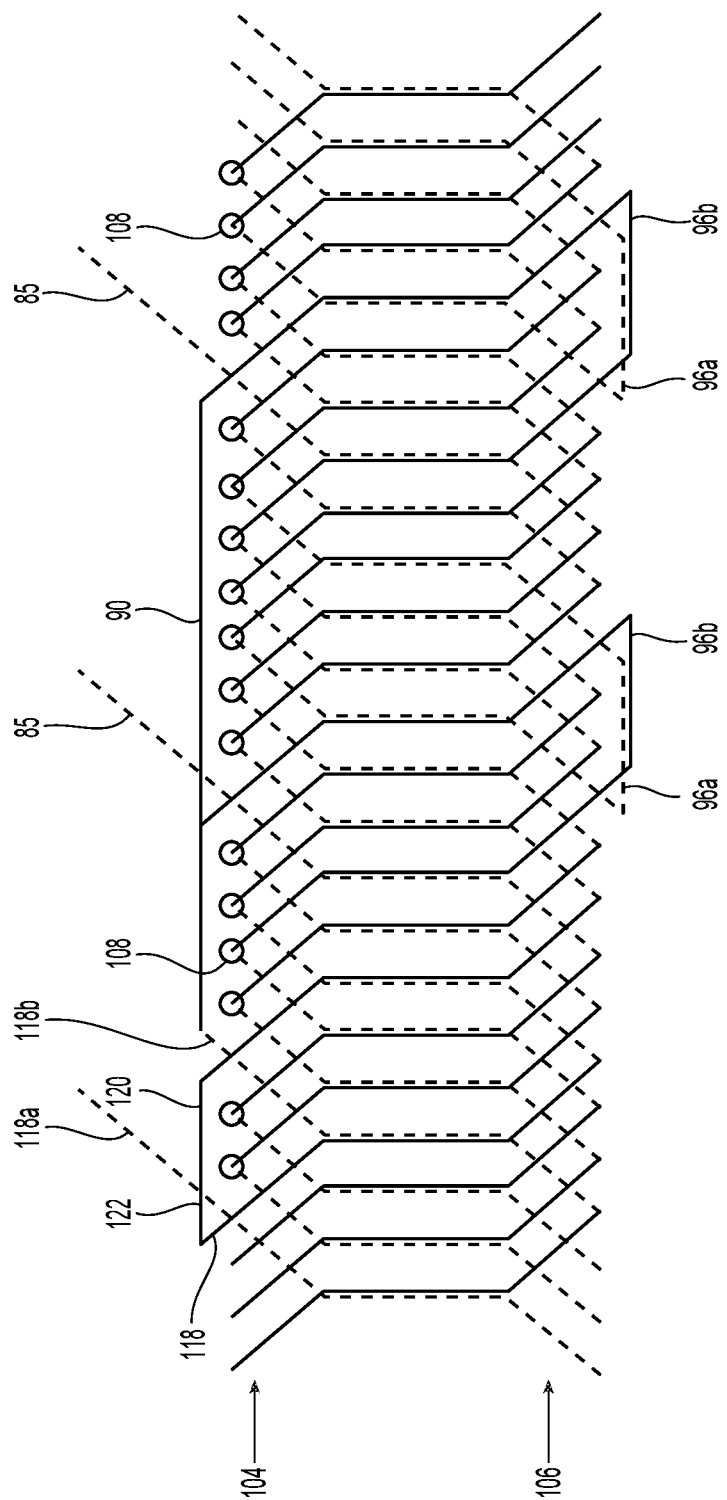
FIG. 8 is another alternative schematic winding diagram depicting three windings.
Figure 10:
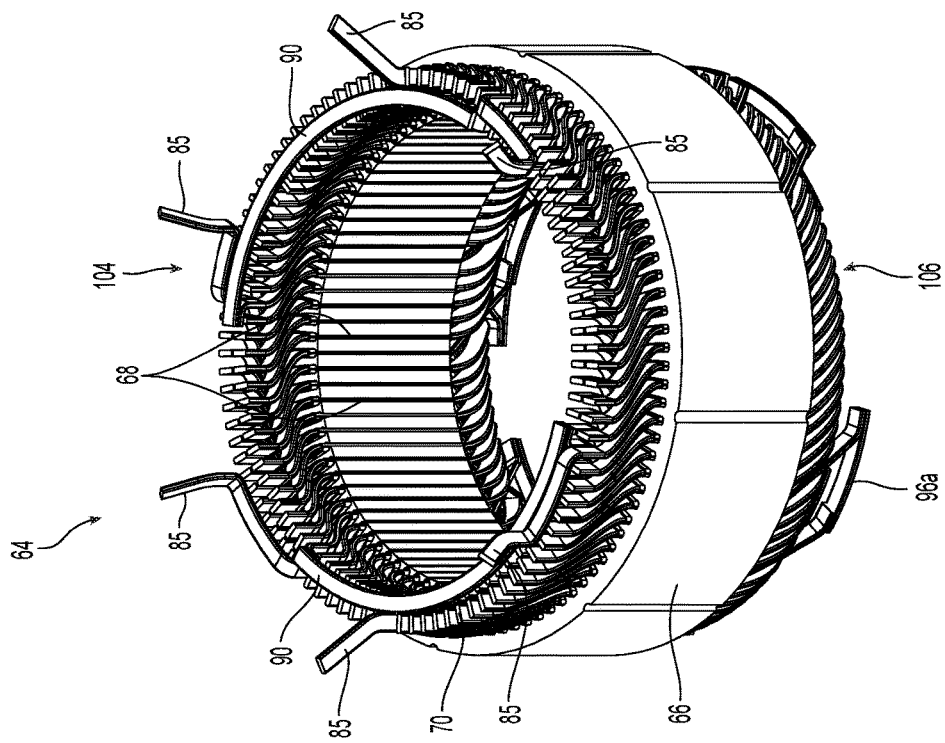
FIG. 10 is another perspective view of the stator assembly of FIG. 9.
Figure 9:
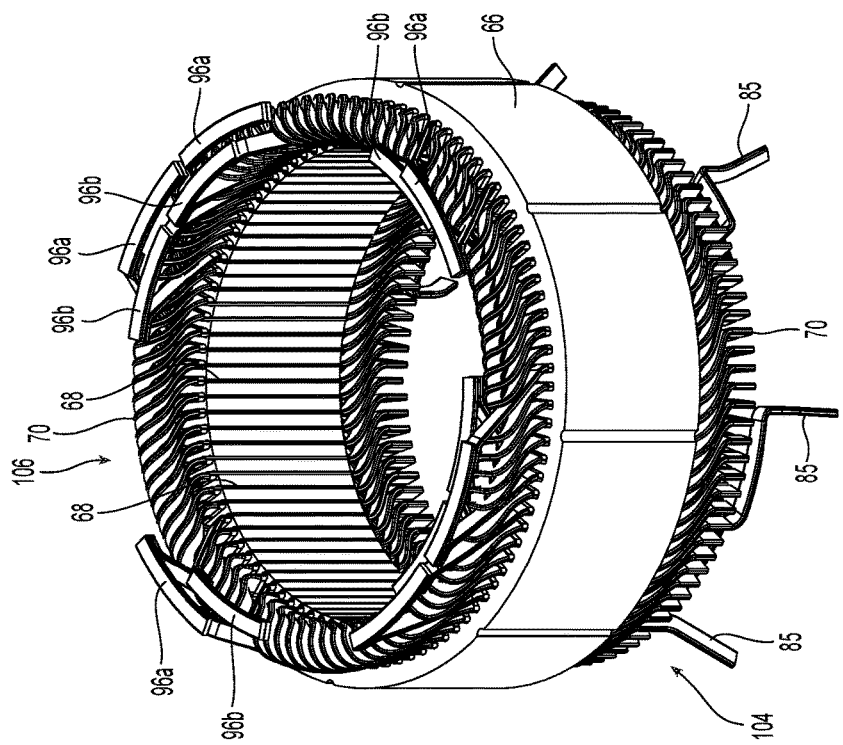
FIG. 9 is a perspective view of a stator assembly.

FIG. 8 is a schematic depiction of another alternative winding arrangement. As mentioned above, it is not necessary for neutral connection 90 to extend the full 360 degrees about the circumference of stator 64. In other words, neutral connection 90 is formed by a conductor defining a segment of a circle that extends for less than 360 degrees and which is disposed at the same radial distance from the axis as one of the first and second layers 98, 100.

In the embodiment of FIG. 8, three windings are used to provide a three-phase electric machine. Two of the windings 70 have the same configuration as that depicted in FIG. 5 with each of the windings 70 having end loops 96a, 96b at the second axial end 106. The third winding 118, has a different configuration. This third winding 118, has a reversing end loop 120 at the first axial end 104 that is circumferentially offset from neutral connection 90 whereby both neutral connection 90 and the reversing end loop 120 can be located in the same layer and at the same axial location. In the illustrated embodiment of FIG. 8, reversing loop 120 and neutral connection 90 are located in the second layer. In the embodiment of FIG. 8, reversing end loop 120 forms a series connection 122 at first end 104 wherein the reversing end loop 120 connects two slot segments 94 disposed in the same layer position. The end loops of winding 118 at the second axial end 106 all connect one of the slot segments 94 in the first layer 98 to one of the slot segments 94 in the second layer 100. A first end 118a of winding 118 forms a stator lead similar to leads 85 and the second end 118b of winding 118 forms a neutral lead which is connected to the same neutral connection 90 as neutral leads 87.

Figure 14:
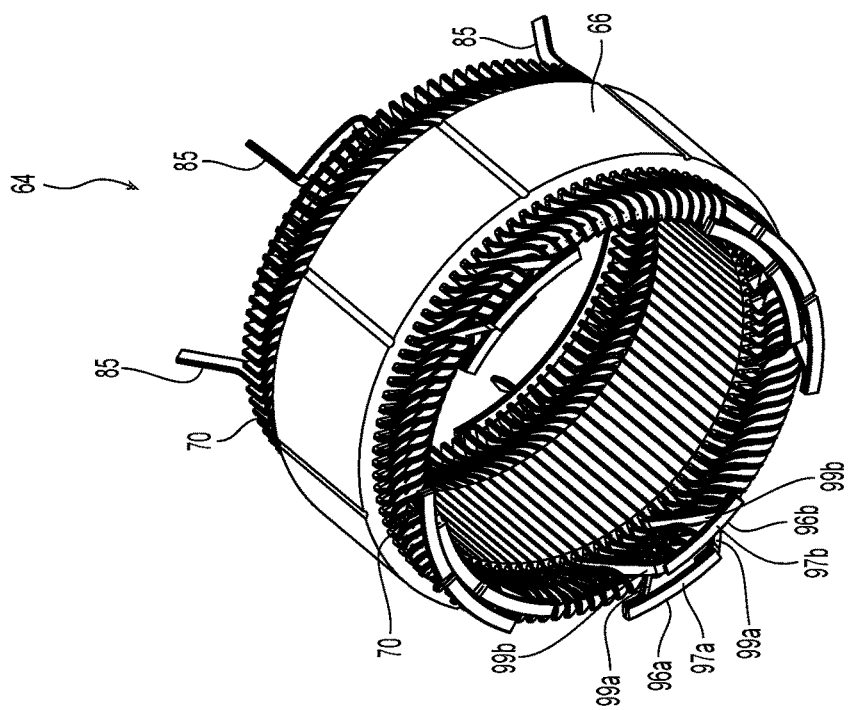
FIG. 14 is another perspective view of the stator assembly of FIG. 13.
Figure 13:
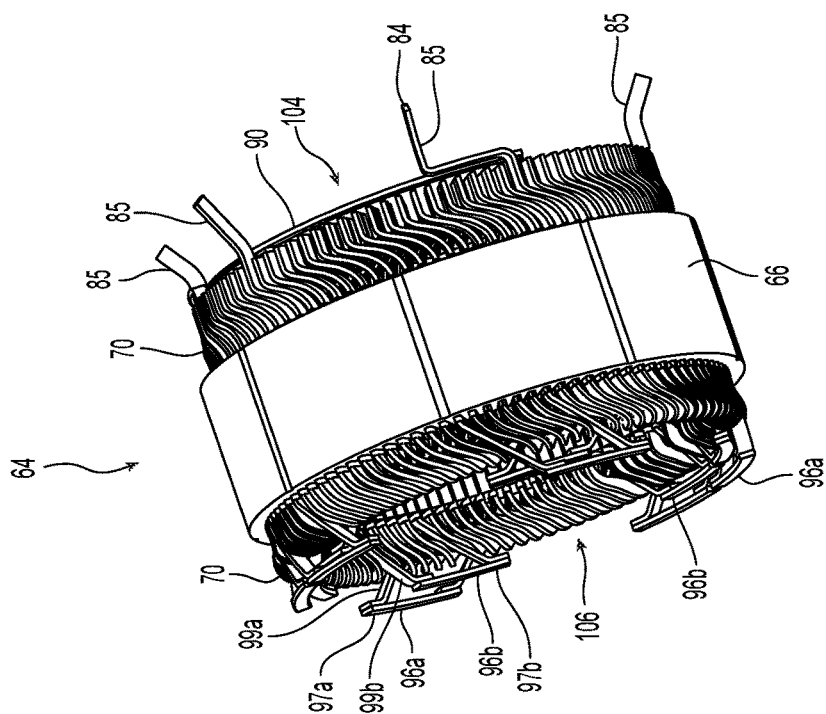
FIG. 13 is a perspective view of a stator assembly.

Another aspect of end loops 96a, 96b that facilitates the manufacture of the end loops can be understood with reference to FIGS. 13 and 14. In this embodiment, end loop 96a defines a central portion 97a and a pair of legs 99a. Similarly, end loop 96b defines a central portion 97b and a pair of legs 99b. The two different pairs of legs are inclined in opposite directions to enhance clearance between the two end loops and facilitate the manufacture of the end loops. More specifically, in the illustrated embodiment, legs 99a are inclined in a clockwise direction while legs 99b are inclined in a counterclockwise direction.

Figure 17:
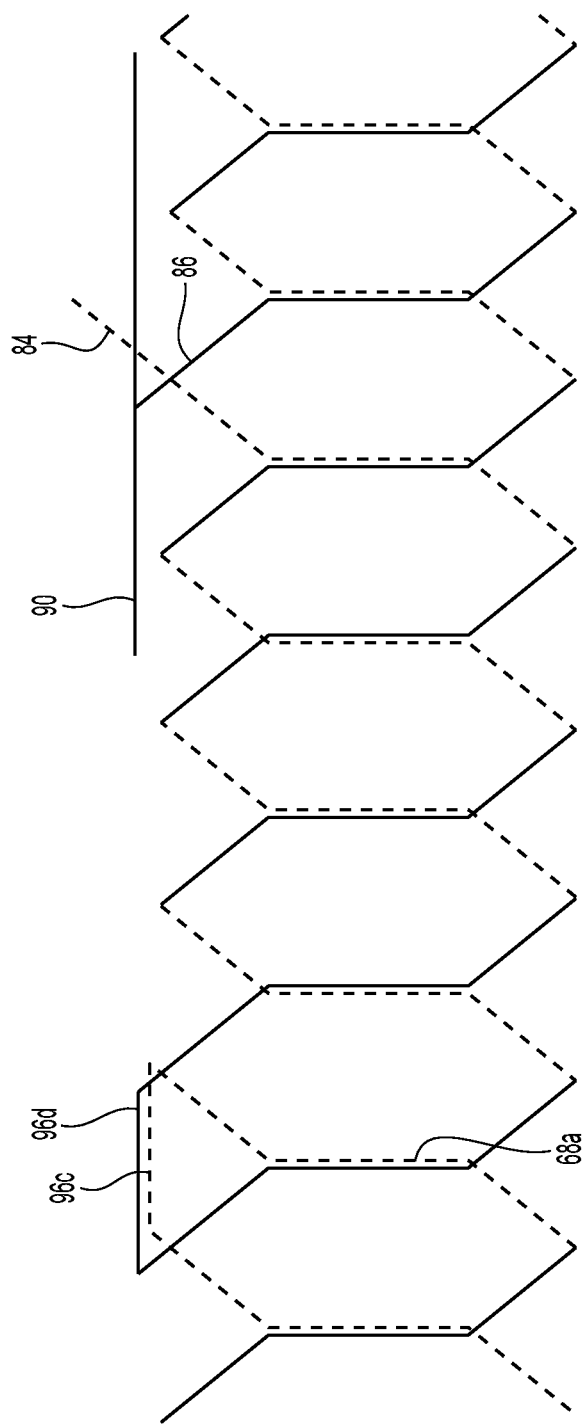
FIG. 17 is a schematic winding diagram depicting a single winding.

FIG. 17 is a schematic diagram of a winding that may be employed in another embodiment. In this embodiment, special end loops associated with a select stator slot 68a are located on the same axial end of the stator as the first and second ends 84, 86 of the winding. As shown in FIG. 17, one of the slot segments in select stator slot 68a is connected with end loop end loop 96c which connects two stator slot segments that are both in the same layer position while a second stator slot segment located in select stator slot 68a and disposed in a different layer position is connected with end loop 96d. Loop 96d connects two stator slot segments that are both in the same layer position. In such an arrangement it may be desirable to offset select stator slot 68a from winding ends 84, 86 by approximately 180 degrees. Only a single winding of a single phase is shown in FIG. 17. This arrangement of FIG. 17 can be combined with additional windings forming additional phases in a single electrical machine. For example, a three phase electrical machine might employ two windings having the configuration shown in FIG. 5 to form two phases and a third winding having the configuration shown in FIG. 17 to form the third phase. Any number of other combinations are also possible and may be desirable for a particular application. It is also noted that while only a single select stator slot 68a is shown in FIG. 17, a larger number of odd number of select stator slots 68a could be employed and still provide for the ends of the winding to be disposed in different layer positions and reduce spatial conflicts at the axial ends of the stator. Moreover, if desired, some of the odd number of select stator slots 68a could have end loops 96a, 96b at one axial end of the stator and other select stator slots 68a could employ end loops 96c, 96d at the other axial end of the stator.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
   a rotor rotatable about an axis and operably coupled with a stator wherein the stator defines opposing first and second axial ends and a plurality of axially extending stator slots;
   at least one winding defining at least one phase, the at least one winding including a first winding of a first phase wherein the first winding comprises:
     a conductor extending from a first end to a second end wherein, between the first and second ends, the winding defines a plurality of slot segments and a plurality of end loops, each of the slot segments being disposed within one of the stator slots and each of the end loops connecting a pair of the slot segments disposed in different stator slots; and
   wherein each of the stator slots define a plurality of layer positions, each of the layer positions being at a different radial distance from the axis whereby slot segments are positionable in the plurality of layer positions of each stator slot;
   wherein at least 60 percent of the end loops defined by the first winding connect a slot segment disposed in one of the plurality of layer positions with another slot segment disposed in another one of the plurality of layer positions; and
   wherein, for the first winding, the electric machine defines an odd number of select stator slots wherein, at each of the select stator slots, first and second slot segments disposed in the select stator slot are located in different layer positions, the first and second slot segments being respectively connected to first and second end loops wherein the first end loop connects the first slot segment with a third slot segment disposed in the same layer position as the first slot segment and the second end loop connects the second slot segment with a fourth slot segment disposed in the same layer position as the second slot segment.

2. The electric machine of claim 1 wherein the first and second ends of the first winding are disposed at the first axial end of the stator and the first and second end loops are disposed at the second axial end of the stator.

3. The electric machine of claim 2 wherein there is only one select stator slot.

4. The electric machine of claim 2 wherein the first and second ends of the first winding are connected with slot segments disposed in different layer positions.

5. The electric machine of claim 2 wherein the first winding comprises a plurality of hairpin segments wherein each hairpin segment defines an end turn connecting two legs, each of the two legs defining a slot segment with the distal portion of the legs defining a portion of an end turn and wherein distal portions of separate and adjacent hairpin segments are welded together to form the conductor defining the winding and wherein the welds are all disposed on the second axial end of the stator.

6. The electric machine of claim 1 wherein the first and second ends of the first winding and the first and second end turns are all disposed at the first axial end of the stator.

7. The electric machine of claim 6 wherein there is only one select stator slot.

8. The electric machine of claim 1 wherein there is only one select stator slot.

9. The electric machine of claim 1 wherein the first end loop defines a first pair of legs and a first central portion extending between the first pair of legs and a second end loop defines a second pair of legs and a second central portion extending between the second pair of legs, each of the legs of the first and second end loops being connected with a slot segment and wherein one of the first and second pair of legs are inclined in a clockwise direction and the other one of the first and second pair of legs are inclined in a counter-clockwise direction.

10. The electric machine of claim 1 wherein the electric machine defines a three phase electric machine and a second phase of the electric machine is defined, at least in part, by a second winding which comprises:
   a second conductor extending from a third end to a fourth end wherein, between the third and fourth ends, the second winding defines a second plurality of slot segments and a second plurality of end loops, each of the second plurality of slot segments being disposed within one of the stator slots and each of the second plurality of end loops connecting a pair of the second plurality of slot segments disposed in different stator slots; and
   wherein at least 60 percent of the second plurality of end loops defined by the second winding connect a slot segment disposed in one of the plurality of layer positions with another slot segment disposed in another one of the plurality of layer positions; and
   wherein, for the second phase, the electric machine defines an odd number of second phase select stator slots wherein, at each of the second phase select stator slots, fifth and sixth slot segments disposed in the second phase select stator slot are located in different layer positions, the fifth and sixth slot segments being respectively connected to third and fourth end loops wherein the third end loop connects the fifth slot segment with a seventh slot segment disposed in the same layer position as the fifth slot segment and the fourth end loop connects the sixth slot segment with an eighth slot segment disposed in the same layer position as the sixth slot segment.

11. The electric machine of claim 10 wherein the first and second ends of the first winding and the third and fourth ends of the second winding are all disposed at the first axial end of the stator, and wherein the first, second, third and fourth end loops are all disposed at the second axial end of the stator and wherein the electric machine further comprises a neutral connection, the neutral connection being connecting with one of the first and second ends of the first winding and one of the third and fourth ends of the second winding, the neutral connection being formed by a conductor defining a segment of a circle that extends for less than 360 degrees and which is disposed at the same radial distance from the axis as one of the first and second slot segments at the first axial end of the stator.

12. The electric machine of claim 11 wherein the third phase is defined, at least in part, by a third winding which comprises:
   a third conductor extending from a fifth end to a sixth end, the fifth and sixth ends being disposed at the first axial end of the stator and wherein, between the fifth and sixth ends, the third winding defines a third plurality of slot segments and a third plurality of end loops, each of the third plurality of slot segments being disposed within one of the stator slots and each of the third plurality of end loops connecting a pair of the third plurality of slot segments disposed in different stator slots; and
   wherein, at the first axial end of the stator and for the stator slots within the circular segment defined by the neutral connection, the third plurality of end loops defined by the third winding connect a slot segment disposed in one of the plurality of layer positions with another slot segment disposed in another one of the plurality of layer positions.

13. The electric machine of claim 12 wherein:
   at least 60 percent of the third plurality of end loops defined by the third winding connect a slot segment disposed in one of the plurality of layer positions with another slot segment disposed in another one of the plurality of layer positions; and
   wherein, for the third phase, the electric machine defines an odd number of third phase select stator slots wherein, at each of the third phase select stator slots, ninth and tenth slot segments disposed in the third phase select stator slot are located in different layer positions, the ninth and tenth slot segments being respectively connected to fifth and sixth end loops wherein the fifth end loop connects the ninth slot segment with an eleventh slot segment disposed in the same layer position as the ninth slot segment and the sixth end loop connects the tenth slot segment with a twelfth slot segment disposed in the same layer position as the tenth slot segment.

14. The electric machine of claim 13 wherein there is only one select stator slot, there is only one second phase select stator slot, there is only one third phase select stator slot and wherein the fifth and sixth end loops are disposed at the first axial end of the stator.

15. An electric machine comprising:
   a rotor rotatable about an axis and operably coupled with a stator wherein the stator defines opposing first and second axial ends and a plurality of axially extending stator slots;
   at least one winding defining at least one phase, the at least one winding including a first winding of a first phase wherein the first winding comprises:
      a conductor extending from a first end to a second end wherein, between the first and second ends, the winding defines a plurality of slot segments and a plurality of end loops, each of the slot segments being disposed within one of the stator slots and each of the end loops connecting a pair of the slot segments disposed in different stator slots; and wherein each of the stator slots define a plurality of layer positions, each of the layer positions being at a different radial distance from the axis whereby slot segments are positionable in the plurality of layer positions of each stator slot;

wherein the first winding defines a series connection at the first axial end of the stator at the midpoint of the first winding and wherein the midpoint of the first winding is formed in an end loop connecting a pair of slot segments disposed in different layer positions; and wherein, for the first winding, the electric machine defines an odd number of select stator slots wherein, at each of the select stator slots, first and second slot segments disposed in the select stator slot are located in different layer positions, the first and second slot segments being respectively connected to first and second end loops wherein the first end loop connects the first slot segment with a third slot segment disposed in the same layer position as the first slot segment and the second end loop connects the second slot segment with a fourth slot segment disposed in the same layer position as the second slot segment.

16. The electric machine of claim 15 wherein at least 60 percent of the end loops defined by the first winding connect a slot segment disposed in one of the plurality of layer positions with another slot segment disposed in another one of the plurality of layer positions.

17. The electric machine of claim 15 wherein the electric machine defines a three phase electric machine and a second phase of the electric machine is defined, at least in part, by a second winding which comprises:

a second conductor extending from a third end to a fourth end wherein, between the third and fourth ends, the second winding defines a second plurality of slot segments and a second plurality of end loops, each of the second plurality of slot segments being disposed within one of the stator slots and each of the second plurality of end loops connecting a pair of the second plurality of slot segments disposed in different stator slots;

wherein the second winding defines a series connection at the first axial end of the stator at the midpoint of the second winding and wherein the midpoint of the second winding is formed in an end loop connecting a pair of slot segments disposed in different layer positions; and wherein, for the second phase, the electric machine defines an odd number of second phase select stator slots wherein, at each of the second phase select stator slots, fifth and sixth slot segments disposed in the second phase select stator slot are located in different layer positions, the fifth and sixth slot segments being respectively connected to third and fourth end loops wherein the third end loop connects the fifth slot segment with a seventh slot segment disposed in the same layer position as the fifth slot segment and the fourth end loop connects the sixth slot segment with an eighth slot segment disposed in the same layer position as the sixth slot segment.

18. The electric machine of claim 17 wherein the third phase is defined, at least in part, by a third winding which comprises:

a third conductor extending from a fifth end to a sixth end, the fifth and sixth ends being disposed at the first axial end of the stator and wherein, between the fifth and sixth ends, the third winding defines a third plurality of slot segments and a third plurality of end loops, each of the third plurality of slot segments being disposed within one of the stator slots and each of the third plurality of end loops connecting a pair of the third plurality of slot segments disposed in different stator slots;

wherein the second winding defines a series connection at the first axial end of the stator at the midpoint of the second winding and wherein the midpoint of the second winding is formed in an end loop connecting a pair of slot segments disposed in different layer positions; and wherein, for the third phase, the electric machine defines an odd number of third phase select stator slots wherein, at each of the third phase select stator slots, ninth and tenth slot segments disposed in the third phase select stator slot are located in different layer positions, the ninth and tenth slot segments being respectively connected to fifth and sixth end loops wherein the fifth end loop connects the ninth slot segment with an eleventh slot segment disposed in the same layer position as the ninth slot segment and the sixth end loop connects the tenth slot segment with a twelfth slot segment disposed in the same layer position as the tenth slot segment.

19. The electric machine of claim 18 wherein the end loop containing the midpoint of the first winding, the end loop containing the midpoint of the second winding and the end loop containing the midpoint of the third winding are all shaped similar to immediately adjacent end loops and thereby nest with the immediately adjacent end loops.

20. The electric machine of claim 15 wherein the first end loop defines a first pair of legs and a first central portion extending between the first pair of legs and a second end loop defines a second pair of legs and a second central portion extending between the second pair of legs, each of the legs of the first and second end loops being connected with a slot segment and wherein one of the first and second pair of legs are inclined in a clockwise direction and the other one of the first and second pair of legs are inclined in a counter-clockwise direction.

\* \* \* \* \*

UNITED STATES PATENT AND TRADEMARK OFFICE
CERTIFICATE OF CORRECTION

PATENT NO. : 9,979,242 B2  
APPLICATION NO. : 15/135320  
DATED : May 22, 2018  
INVENTOR(S) : Kirk Neet and Timothy J. Sailors Page 1 of 1

It is certified that error appears in the above-identified patent and that said Letters Patent is hereby corrected as shown below:

In the Claims

Claim 11, Column 14, Line 5 the phrase "being connecting" should read --being connected--.

Signed and Sealed this  
Tenth Day of July, 2018

Andrei Iancu  
*Director of the United States Patent and Trademark Office*